(12) United States Patent
Cross (10) Patent No.: US 11,378,373 B2
(45) Date of Patent: Jul. 5, 2022

(54) ADJUSTABLE T-SQUARE

(71) Applicant: Woodpeckers, LLC, Strongsville, OH (US)

(72) Inventor: Steven Charles Cross, Mentor, OH (US)

(73) Assignee: WOODPECKERS, LLC, Strongsville, OH (US)

( * ) Notice: Subject to any disclaimer, the term of this patent is extended or adjusted under 35 U.S.C. 154(b) by 161 days.

(21) Appl. No.: 16/925,467

(22) Filed: Jul. 10, 2020

(65) Prior Publication Data
US 2022/0011084 A1    Jan. 13, 2022

(51) Int. Cl.
| G01B 3/00 | (2006.01) |
| G08B 7/00 | (2006.01) |
| G01B 3/56 | (2006.01) |
| G01B 3/04 | (2006.01) |

(52) U.S. Cl.
CPC .............. *G01B 3/004* (2013.01); *G01B 3/04* (2013.01); *G01B 3/566* (2013.01); *G08B 7/00* (2013.01)

(58) Field of Classification Search
CPC .......... G01B 3/004; G01B 3/04; G01B 3/566; G08B 7/00
See application file for complete search history.

(56) References Cited

U.S. PATENT DOCUMENTS

| 1,023,242 A | 4/1912 | Childs |
| 1,458,152 A | 6/1923 | Schenck |
| D89,818 S | 5/1933 | Tautz |
| 2,423,786 A | 7/1947 | Morris |
| 2,435,529 A | 2/1948 | Brockley |
| 2,588,079 A | 3/1952 | Boehm |
| 4,169,386 A | 10/1979 | McMahan |
| D265,725 S | 8/1982 | Ingram |
| 4,463,632 A * | 8/1984 | Parke ................. B25G 1/063 403/93 |
| D314,712 S | 2/1991 | Kunz |
| 5,097,601 A | 3/1992 | Pollak |
| 5,205,045 A | 4/1993 | Liu |
| 5,471,753 A | 12/1995 | Rodrigues |
| D400,452 S | 11/1998 | Schoene |
| D400,453 S | 11/1998 | Holland |
| 5,845,410 A | 12/1998 | Boker |
| 5,915,806 A | 6/1999 | Levee |

(Continued)

FOREIGN PATENT DOCUMENTS

CN    202151976 U  *  2/2012

OTHER PUBLICATIONS

The Ultimate Woodworking Layout Tool, Posi-Lock T-Square, YouTube, Publication date: Dec. 17, 2019, (online) URL: https://www.youtube.com/watch?v=2fp3cDQSPME (Year: 2019).

(Continued)

*Primary Examiner* — Mohamed Barakat
(74) *Attorney, Agent, or Firm* — Sand, Sebolt & Wernow Co., LPA (57) ABSTRACT

An adjustable T-square device and method of use is shown and described herein. The adjustable T-square has a plurality of apertures with at least one locking detent to set precise angles. The adjustable T-square has a locking pin to further engage a ruler portion to a head portion to minimize error when using the device.

20 Claims, 10 Drawing Sheets (56) References Cited

U.S. PATENT DOCUMENTS

| | | | | |
|---|---|---|---|---|
| 6,049,990 | A * | 4/2000 | Holland | B43L 7/02 33/468 |
| 7,409,773 | B1 * | 8/2008 | Gioia | B43L 7/00 33/527 |
| 8,782,914 | B1 * | 7/2014 | DeLuca | G01B 3/06 33/458 |
| D764,322 | S | 8/2016 | Zhang | |
| D870,574 | S | 12/2019 | O'Halloran | |
| D927,332 | S | 8/2021 | Geiger | |
| 2007/0074413 | A1 * | 4/2007 | Neuroth | G01B 3/566 33/429 |
| 2013/0025142 | A1 * | 1/2013 | Holt | B43L 7/14 33/456 |
| 2015/0047214 | A1 * | 2/2015 | Chernyshou | G01B 3/04 33/479 |
| 2015/0168122 | A1 | 6/2015 | Cruickshanks | |
| 2017/0320354 | A1 * | 11/2017 | Brown | B43L 7/14 |
| 2019/0225009 | A1 | 7/2019 | Hummel | |
| 2021/0325161 | A1 | 10/2021 | Turley | |
| 2021/0325163 | A1 | 10/2021 | Turley | |
| 2022/0011084 | A1 | 1/2022 | Cross | |

OTHER PUBLICATIONS

MUSIBO Adjustable Protractor Angle Finder, Woodworkers Edge Ruler, Multi-Function Angle Measure Tool Woodworking Ruler Kit, Amazon, publication date: Jun. 29, 2021, (online) URL: https://www.amazon.com/Adjustable-Protractor-Woodworkers-Multi-Function-Woodworking/dp/B0987JMZDX/ref=sr_1_? (Year: 2021).

* cited by examiner

ADJUSTABLE T-SQUARE

TECHNICAL FIELD

Generally, the disclosure relates to an adjustable T-square with a head portion and a ruler portion. Particularly, the disclosure relates to an adjustable T-square with a head portion with indicia of angles and at least one locking detent. Specifically, the disclosure relates to an adjustable T-square with at least one locking detent with a plurality of angle apertures and a locking pin to secure and allow for precise angles to be drawn by a user.

BACKGROUND

Background Information

T-squares are used commonly as a guide for drawing horizontal lines. The name T-square comes from the tool's resemblance to the capital letter T in the English language. Generally, T-squares consist of two components, a short shaft called a "head" or a "stock" and a long shaft called a "blade". The inside edge of the head or stock of the T-square is placed against a working edge of a work surface desired to be drawn on. The off-hand of the user may then be moved to secure the T-square against the edge of the board. Then, when in position for drawing a line, the T-square may then be held firmly in position with the heel of the off-hand now moved to the end of the T-square blade, while the user draws a straight line with their dominant hand across the work surface.

While accuracy is always important, accuracy is paramount with T-squares when used as a woodworking tool. Many times the lines drawn on wood are then used to facilitate cuts in the wood or lay out multiple pieces on one large piece that will be cut into multiple pieces. A wrong cut leads to wasted wood and material which in turn increases costs. Many times, a woodworker will use a tape measure and a scrap piece of wood, presenting a difficult challenge to even the most seasoned of woodworkers to ensure accuracy.

At times, the woodworker may need to make cuts at angles different than 90 degrees. Specifically, when doing angled layout work, an error of half a degree will be less than the thickness of a pencil line at two inches. But, that same error at two feet grows to a much larger error. These errors may be fatal or at the very least problematic to the woodworker and the ultimately finished work piece.

SUMMARY

As such, the ability to accurately draw angled lines on a work surface is needed.

In one aspect, an exemplary embodiment of the present disclosure may provide an adjustable T-square comprising: a head portion with a body adapted to sit adjacent to a work surface; a ruler portion that is movable relative to the head portion; a locking mechanism operative to lock the ruler portion in a fixed position relative to the head portion; and an alignment mechanism. This embodiment or another exemplary embodiment may provide a pivot pin adapted to move the ruler portion relative to the head portion when the locking mechanism is disengaged. This embodiment or another exemplary embodiment may provide at least one locking pin. This embodiment or another exemplary embodiment may provide that the at least one locking pin and the pivot pin are operative to prevent movement of the ruler portion with respect to the head portion. This embodiment or another exemplary embodiment may provide at least one locking detent. This embodiment or another exemplary embodiment may provide a body operatively engaged with a spring. This embodiment or another exemplary embodiment may provide that the ruler portion has a first portion containing a plurality of angle apertures and a second portion. This embodiment or another exemplary embodiment may provide that the plurality of angle apertures are operative to accept the at least one locking detent when at least a portion of the body is within the aperture and the spring is in its extended position. This embodiment or another exemplary embodiment may provide a faceplate that extends partially over a first end of the ruler portion and is operatively connected to the head portion. This embodiment or another exemplary embodiment may provide a channel formed by the faceplate and a top surface of the head portion operative to permit movement of the ruler portion within the channel. This embodiment or another exemplary embodiment may provide a first portion with an arced surface with a plurality of angle apertures. This embodiment or another exemplary embodiment may provide the first portion further includes a track operative to accept a portion of a locking pin. This embodiment or another exemplary embodiment may provide a plurality of indicia indicating angles of the ruler portion with respect to the head portion. This embodiment or another exemplary embodiment may provide audible and tactile feedback members operative to provide audible and tactile feedback to a user that the apparatus is set to a precise angle.

In another aspect, an exemplary embodiment of the present disclosure may provide a method for drawing a straight angled line comprising: rotating a ruler portion of an adjustable T-square; aligning an alignment mechanism with angled indicia on a head portion of the adjustable T-square; engaging a locking mechanism at a precise angle preventing movement of the ruler portion with respect to the head portion; and using an edge of the ruler portion to draw a line with a writing implement at the precise angle. This embodiment or another exemplary embodiment may provide prior to rotating: disengaging a locking mechanism that allows the ruler potion to rotate with respect to the head portion. This embodiment or another exemplary embodiment may provide interlocking at least one locking detent into an aperture on the ruler portion. This embodiment or another exemplary embodiment may provide rotating the ruler portion about a pivot point engaged with the ruler portion and the head portion. This embodiment or another exemplary embodiment may provide hearing audible feedback from the alignment mechanism operative to provide audible feedback to a user; and feeling tactile from the alignment mechanism operative to provide tactile feedback to the user, whereby the audible and tactile feedback are operative to indicate to the user a precise angle is engaged. This embodiment or another exemplary embodiment may provide abutting the head portion against a work surface.

BRIEF DESCRIPTION OF THE SEVERAL VIEWS OF THE DRAWINGS

A sample embodiment of the disclosure is set forth in the following description, is shown in the drawings and is particularly and distinctly pointed out and set forth in the appended claims. The accompanying drawings, which are fully incorporated herein and constitute a part of the specification, illustrate various examples, methods, and other example embodiments of various aspects of the disclosure. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

Similar numbers refer to similar parts throughout the drawings.

DETAILED DESCRIPTION

A new adjustable T-square apparatus 10 and method of operation thereof is depicted in the present disclosure and throughout FIGS. 1-9. The disclosure focuses on an improved adjustable T-square apparatus that allows for highly accurate measurements and operation thereof, as will be discussed hereafter.

Figure 1:
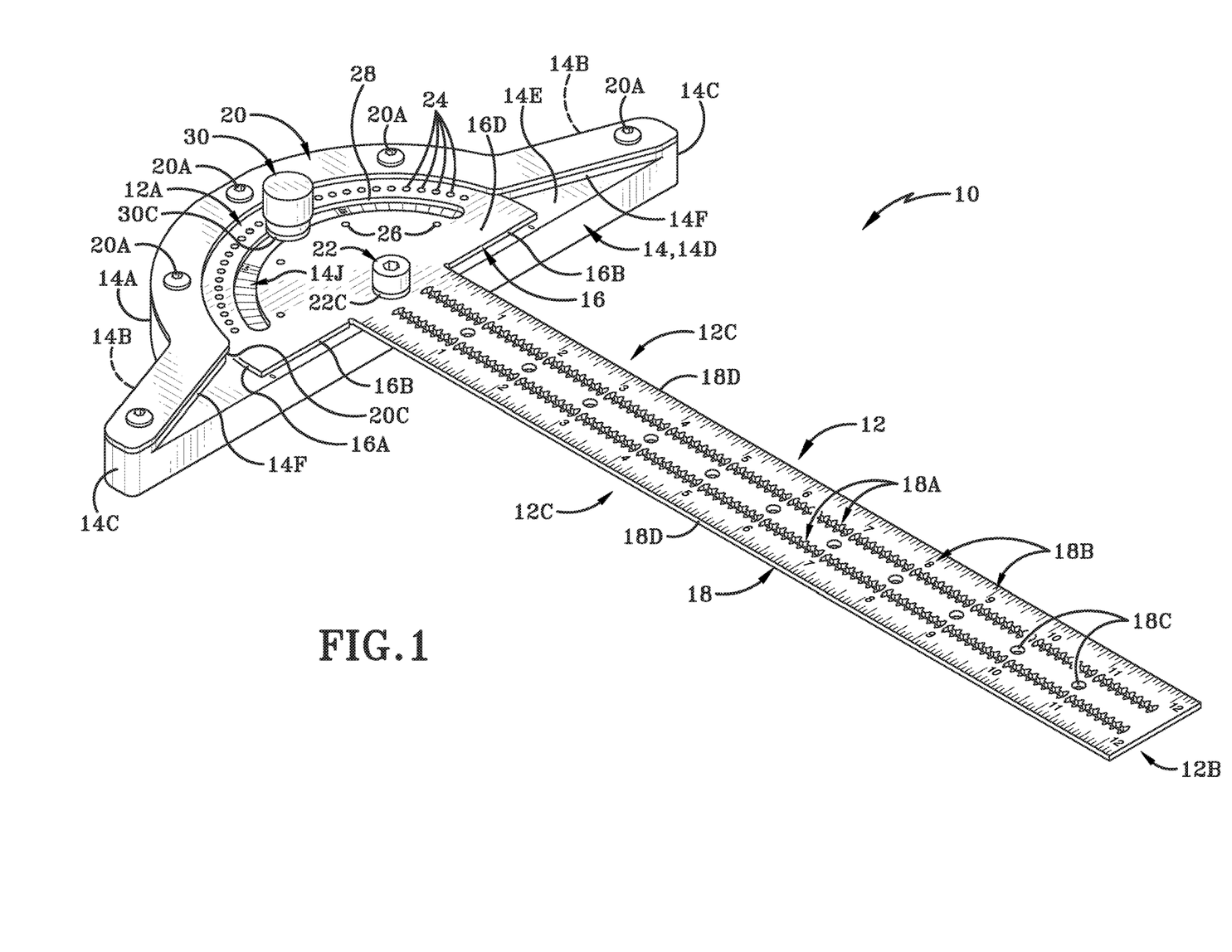
FIG. 1 is a top, left, perspective view of an exemplary adjustable T-square apparatus.

Referring specifically to FIG. 1, a top, left, isometric view of the exemplary adjustable T-square apparatus 10 is shown. The T-square 10 has a body and includes generally a ruler portion 12 and a head portion 14. The ruler portion 12 has a first end 12A that is generally arcuate in nature and a second end 12B longitudinally disposed to the first end 12B. The ruler portion 12 is further bound by a pair of edges 12C that extend parallel to one another. The ruler portion 12 is generally broken into two sections, a first portion 16 or a semi-circular portion 16 (FIG. 3) and a second portion 18 or an arm portion 18, as will be discussed later.

The head portion 14 has a body defined by a first surface 14A that is generally arcuate in nature and forms nearly a half circle followed by on each side an angled portion 14B until hitting a beveled sidewall 14C on each side. The beveled sidewall 14C then is bound by a flat portion 14D so as to be a straight edge. The head portion 14 further incudes a top surface 14E recessed from a ledge 14F and a higher surface 14G where a face plate 20 attached by a plurality of fasteners 20A within apertures 20B on the face plate 20 and apertures 14H on the ledge 14F of the head portion 14. The face plate 20 is further able to overhang slightly over top of the ruler portion 12 in order to retain the ruler portion 12 in relative engagement with the head portion 14. In alternative embodiments the face plate 20 can be integrally formed with the head portion 14 rather than a separate piece. The face plate 20 is operative to form a channel 20C between the face plate 20 and the top surface 14E with a height equal to the height of the ledge 14F. This channel 20C is operative to fit the thickness of the ruler portion 12 with minimal space in-between to retain the ruler portion 12.

Shown on the first portion 16 is an attachment member 22. The attachment member 22 is operative to connect the ruler portion 12 at an aperture 12D to the head portion 14 at its top surface 14F. Further on the first portion 16 is a top surface 16D. Within the top surface 16D of the first portion 16 are a plurality of whole angle apertures 24, and a plurality of half angle apertures 26 as will be discussed later. The head portion 14 further includes indicia of angles 14J as will be better seen in other figures. The attachment member 22 may also be referred to as a pivot point or pivot pin.

Additionally, there is a track 28 within the first portion 16 formed between the top surface 16D and a bottom surface 16E adjacent the arcuate edge 16A. The indicia of angles 14J are seen through the track 28 as will be discussed later. Operative to fit inside of the track 28 and to further secure the first portion 16 to the head portion 14 is a locking pin 30 which will be discussed later with respect to operation. In this embodiment the track 28 is generally C-shaped with rounded edges, though in other embodiments a different configuration is possible commensurate to fit the locking pin 30.

On the second portion 18 are a plurality of notches 18A. These notches 18A are generally saw shaped and are operative to act as scribing guides, and in the case of Imperial measurements designate every 1/16th of an inch coupled with measurement indicia 18B. Other embodiments (not shown) may use metric measurements to designate mm or cm spaced notches with further measurement indicia consistent with metric measurements. The second portion 18 further includes apertures 18C. The second portion 18 also includes edges 18D or sides that run concurrent with the edges 12C of the ruler portion 12. In this embodiment, the second portion 18 is twelve inches, but in other embodiments, though not shown, may be twenty-four inches, thirty-six inches, or longer depending on the desired use.

The first portion 16 and second portion 18 are both made of a sturdy material that may be sufficiently thin so as to have a minimal width in order to decrease the parallax error, or the shift in apparent position of an object due to different viewing position of a user. As such, a user need not make multiple measurements and multiple checks and reducing the error.

Figure 2:
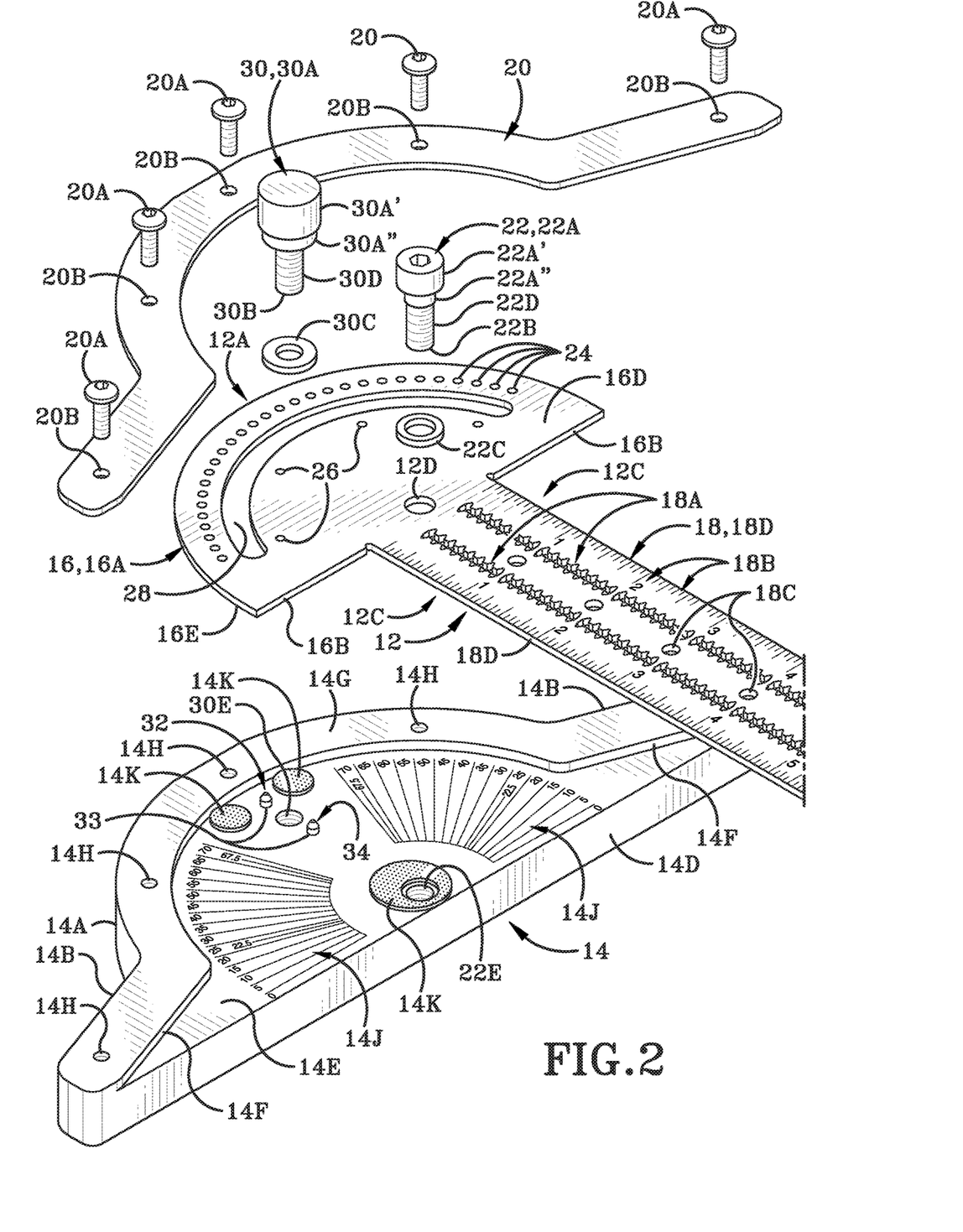
FIG. 2 is a top, left, exploded view of the exemplary adjustable T-square.

Referring specifically to FIG. 2, a top, left, exploded view of the exemplary adjustable T-square 10 is shown. In this view the ruler portion 12 is shown disengaged from the head portion 14. Many of the interior workings of the head portion 14 are shown. Further shown is the attachment member 22 with a bulbous first end 22A and a second end 22B vertically disposed from the first end 22A along with a washer 22C. The washer 22C may be made of any flexible material or otherwise semi-rigid or rigid material. Proximate the first end is a head portion 22A' and a second level 22A" of lesser diameter. In this embodiment proximate the second end 22B is a threaded portion 22D engageably fit into the attachment member aperture 22E. In other embodiments, the threaded portion 22D may instead be smooth or may be any such engagable connection to properly mate with the attachment member aperture 22E. The washer 22C is around the second end 22B of the attachment member 22 over the second level 22A" and contacts head portion 22A'. The second end 22B is then placed through the aperture 12D in the ruler portion 12 prior to securing the attachment member 22 to the head portion 14 via the threaded aperture 22E. Surrounding the threaded aperture 22E is a friction reducing compound 14K. The friction reducing compound 14K facilitates movement. The friction reducing compound 14K may include, but is not limited to, ultra-high molecular weight (UHMW) polyethylene tape, polytetrafluoroethylene (PTFE) tape, or other films, extruded films, skived film, or foam type coatings. As used herein, friction reducing compounds and low friction interface refers to surfaces or components having static and/or kinetic a coefficient of friction less than 0.2.

Locking pin 30 with a bulbous first end 30A and a second end 30B vertically disposed from the first end 30A along with a washer 30C is further shown in FIG. 2. The washer 30C may be made of any flexible or otherwise semi-rigid or rigid material. In this embodiment proximate the second end 30B is a threaded portion 30D to engageably fit into the locking pin aperture 30E. Proximate the first end is a head portion 30A' and a second level 30A" of lesser diameter. In other embodiments, the threaded portion 30D may instead be smooth or may be any such engagable connection to properly mate with the locking pin aperture 30E. The washer 30C is around the second end 30B of the locking pin 30 and the second level 30A" until making contact with the head portion 30A'. Subsequently, through the track 28 prior to securing the locking pin 30 to the head portion 14 via the threaded aperture 30E, the second end 30B is placed. On both sides of the threaded aperture 30E is a friction reducing compound 14K to further facilitate movement. While the aperture 30E is shown to be threaded, any such engagement to retain the locking pin 30 may be used when the threaded portion 30D may not be threaded in other alternative embodiments. The locking pin 30 is operative to act as a locking mechanism, thereby preventing rotation of the ruler portion 12 with respect to the head portion 14 as will be discussed with respect to operation.

Further shown is at least one locking detent. In the exemplary shown embodiment there is a first locking detent 32 within a detent aperture 33 and a second locking detent 34 within an additional detent aperture 33. Each locking detent 32, 34 has a body that includes a tip 32A, 34A, a tapered surface 32B, 34B that is frustoconical in shape and a main body 32C, 34C. The tip 32A and part of the tapered surface 32B of the first locking detent 32 are operative to fit within the whole angle apertures 24 while the tip 34A and part of the tapered surface 34B are operative to fit within the half angle apertures 26. Locking detents 32, 34 act as an alignment mechanism to precisely set an angle as well as part of the locking mechanism as discussed above with respect to the locking pin 30 as the shape discussed later, will restrict movement. The locking detents 32, 34 are discussed in detail with respect to FIG. 6 and FIG. 6A as well as with respect to the operation.

Further seen in this view are the full array of indicia of angles 14J. The indicia 14J are indicated with visual markings and are generally spaced at 5 degree in increments from 0 degrees to 70 degrees. Each of these degree increments from 0 degrees to 70 degrees with five degree increments corresponds to a respective whole angle aperture 24 and where at least one detent such as the first locking detent 32 would click in, as will be discussed later. Alternative embodiments may provide for additional whole degree indicia and thereby additional whole angle apertures 24. A further exemplary embodiment may provide for less than whole angle apertures dependent on the ultimate tool usage. The angle apertures 24 of whatever nature would just need be aligned with the indicia to give an accurate measurement.

There are also four half degree indicia indicated at 22.5 on both the left and right side of the indicia 14J, 67.5 on both the left and right side of the indicia 14J. These half angle numbers correspond to the half angle apertures 26 and the second locking detent 34 would click in, as will be discussed later. Alternative embodiments may provide for additional half degree indicia and thereby additional half angle apertures 26. A further exemplary embodiment may provide for less half angle apertures dependent on the ultimate tool usage.

Figure 3:
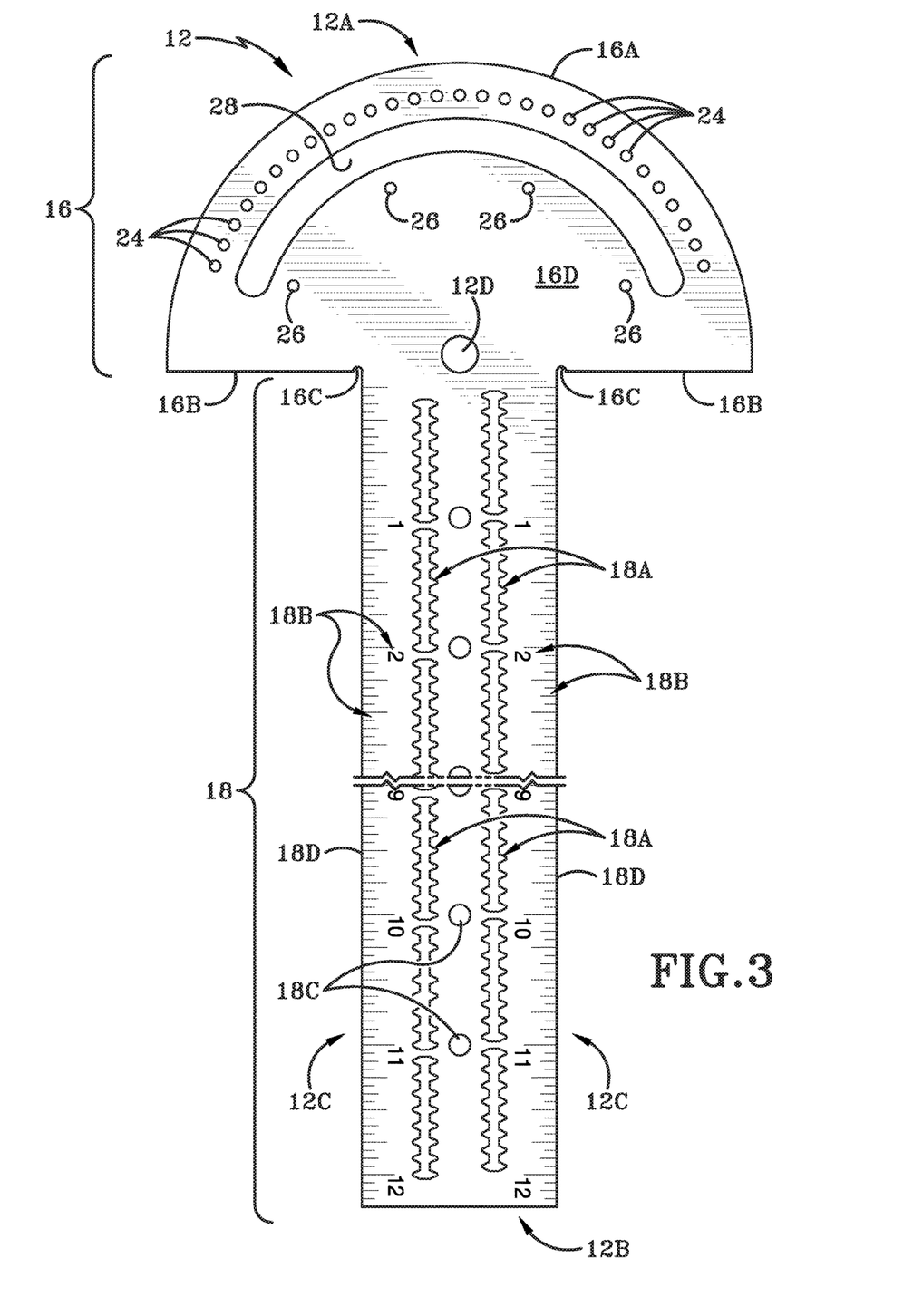
FIG. 3 is a top plan view of an exemplary first portion or semi-circular head portion.

Referring specifically to FIG. 3, the first portion 16 or semi-circular portion 16 is shown attached to the second portion 18. Specifically, the first portion 16 is shown divorced from the head portion 14. The first portion 16 has an arced surface 16A that forms a semi-circle of 180 degrees in radial length. Surface 16A is operative to sit under the face plate 20 but above the top surface 14E of the head portion 14 when at its neutral position, as is shown in FIG. 1-FIG. 7. On each side of the surface 16A is a straight portion 16B. The straight portion 16B is so named as it is at zero degrees on the indicia 14J on the head portion 14. Following each straight portion 16B is a recess 16C. The recess 16C is operative to provide a writing implement access to the surface underneath with its tip placed at the tip of the ruler portion 12.

Figure 4:
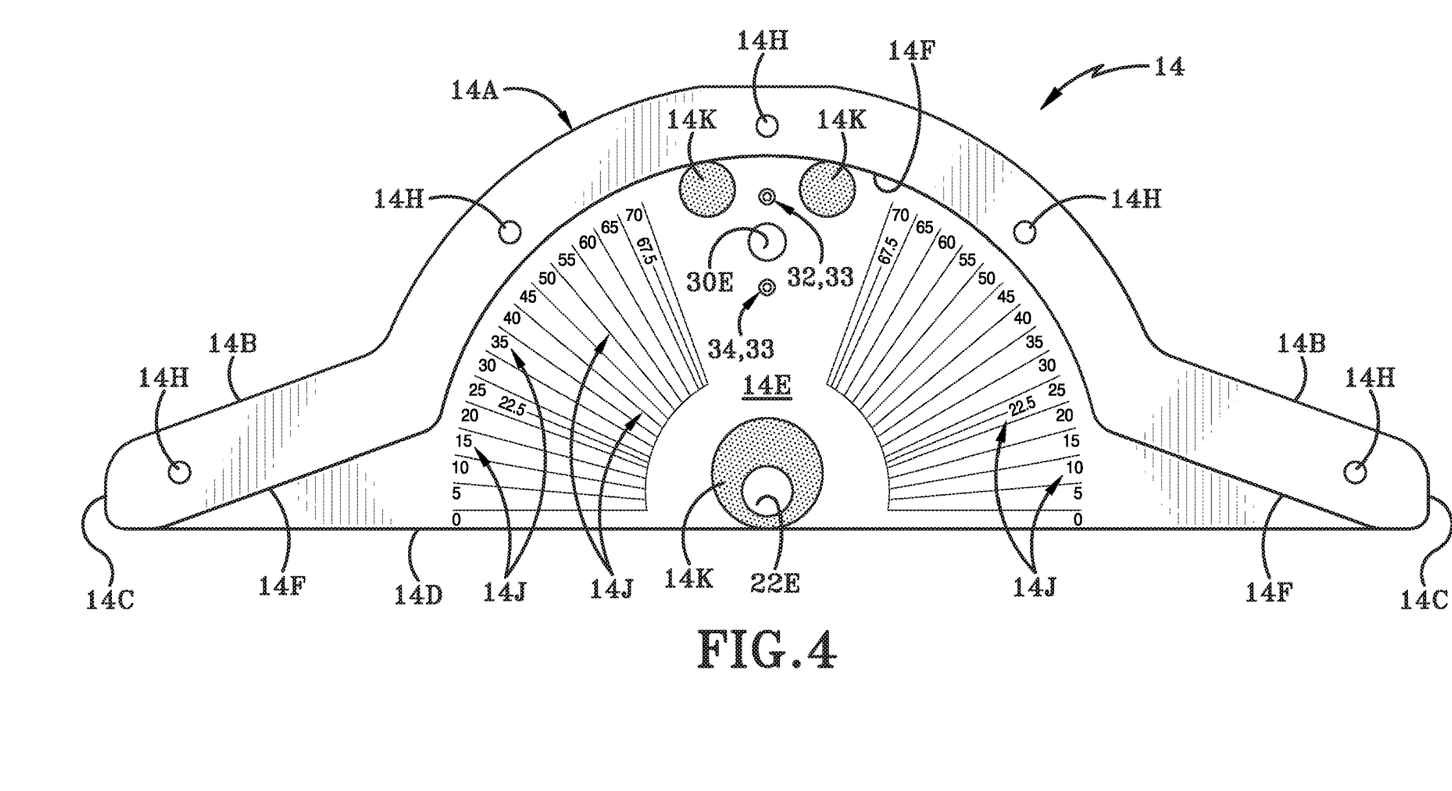
FIG. 4 is a top plan view of an exemplary head portion.

FIG. 4 is a top plan view of the exemplary head portion 14. In this view, the indicia 14J may be better seen indicating the degree increments from 0 degrees to 70 degrees with five degree increments corresponding to a respective whole angle aperture 24 on the first portion 16. Additionally, four half degree indicia indicated at 22.5 on both the left and right side of the indicia 14J and at 67.5 on both the left and right side of the indicia 14J corresponding to the half angle apertures 26 located on the first portion 16.

Figure 5:
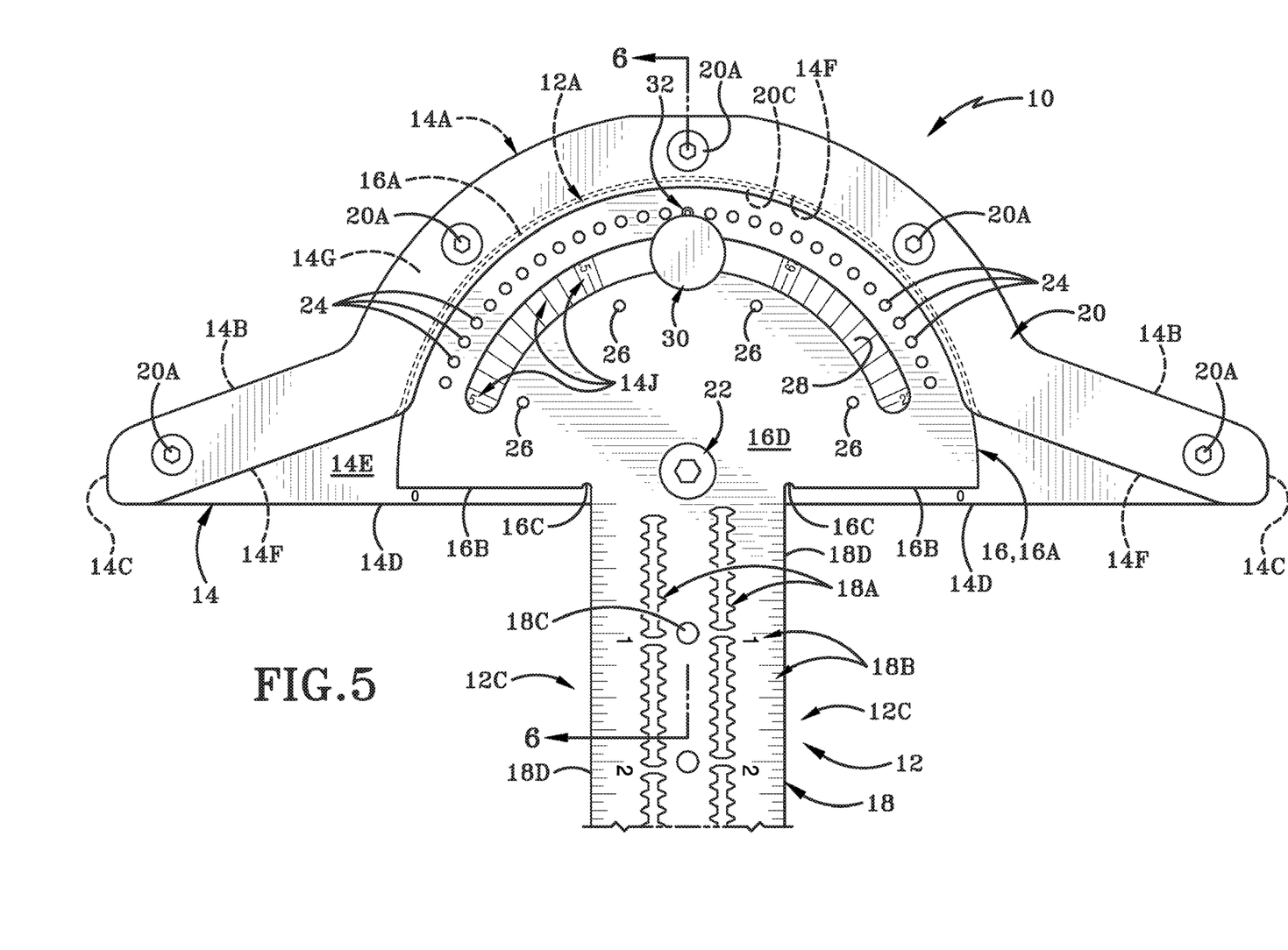
FIG. 5 is a top plan view of the adjustable T-square.
Figure 6:
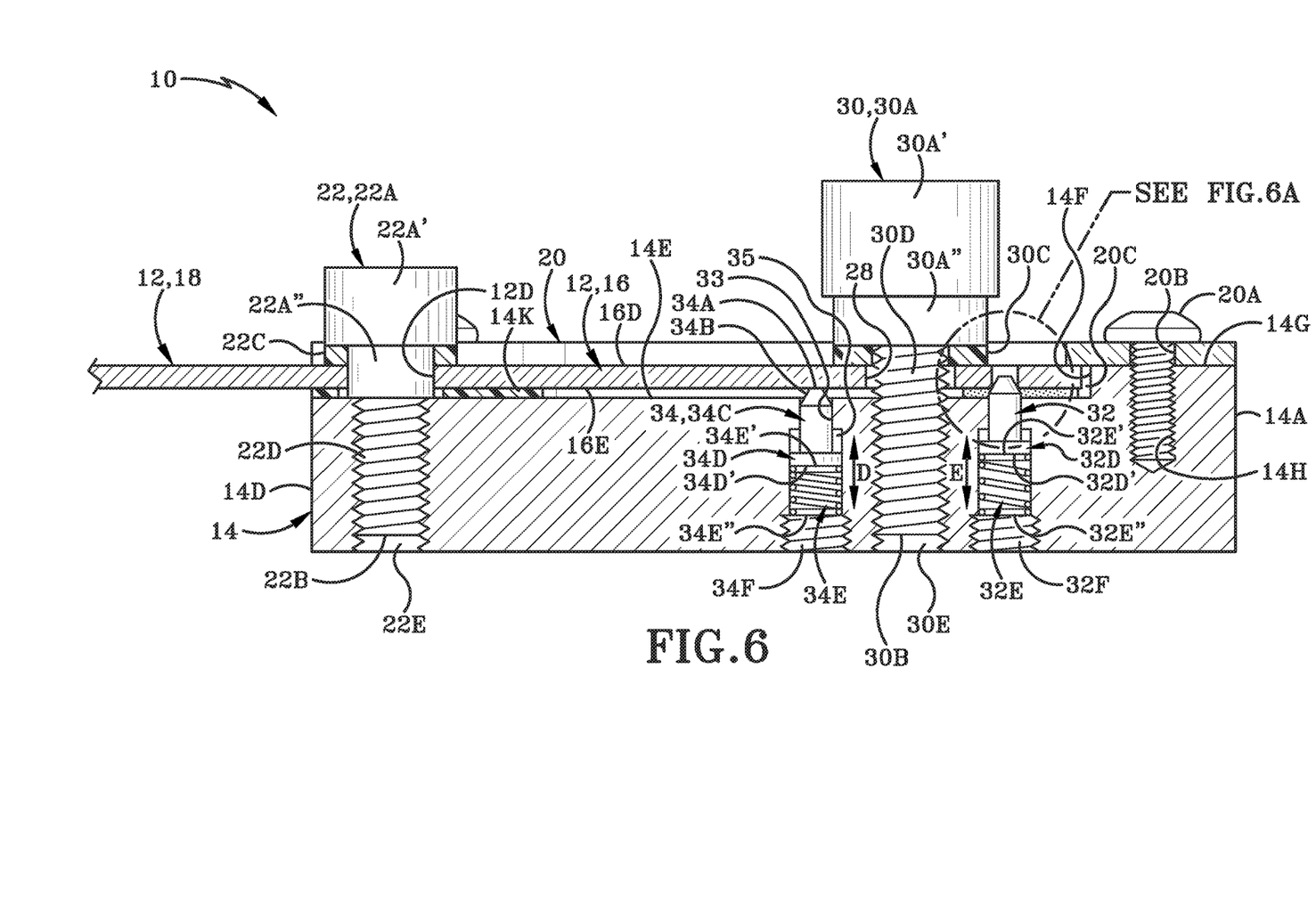
FIG. 6 is a cross-sectional view of the adjustable T-square taken along line 6-6 in FIG. 5
Figure 6A:
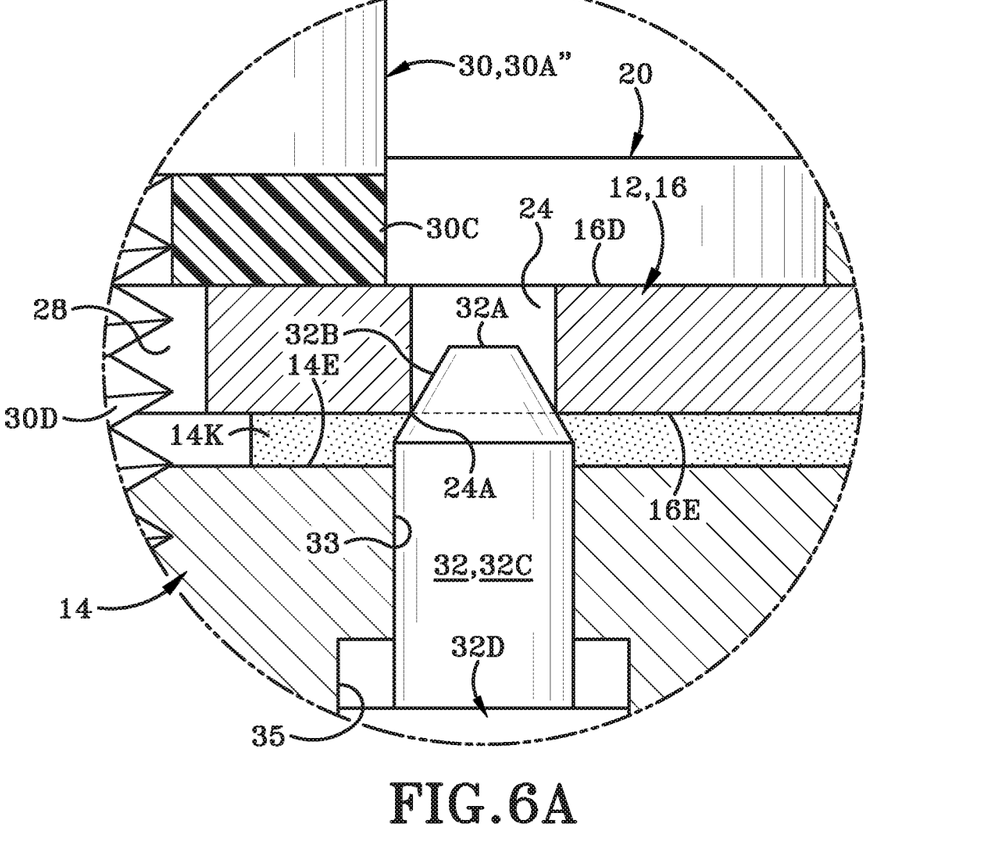
FIG. 6A is a section view of the highlighted portion in FIG. 6 of a spring loaded detent pin.

Referring specifically to FIG. 5, FIG. 6 and FIG. 6A, views of the adjustable T-square 10 are shown. In these views the adjustable T-square 10 is at an angle of 0 degrees with the first locking detent 32 engaged with the whole angle aperture 24 on the first portion 16, threaded into its aperture 30E is the locking pin 30 to secure the first portion 16 to the head portion 14.

Specifically referring to FIG. 6, additional detail is shown with the locking detents 32, 34 via a cross-sectional view taken along line 6-6 on FIG. 5. Each detent 32, 34 fits into an aperture 33 that is more narrow than a housing 35. Each of the locking detents 32, 34 further comprises a wide portion 32D, 34D laterally below the body 32C, 34C and housed within the housing 35. The wide portion 32D, 34D is operative to have slightly less that the diameter of the entire angle aperture 24 or half angle aperture 26, respectively. The wide portion 32D, 34D is operative to interface with a spring 32E, 34E at its bottom 32D', 34D'. The spring 32E, 34E is a compression spring and may be integrally formed with the entirety of the respective locking detent 32, 34 or may be a separate component. The top 32E', 34E' of the spring 32E, 34E is in contact with the bottom 32D', 34D' of the wide portion 32D, 34D. Additionally, a threaded plug 32F, 34F is included that is laterally below the respective spring 32E, 34E and in contact with the bottom 32E", 34E" of the spring 32E, 34E. The threaded plug 32F, 34F is operative to retain a base of the spring 32E, 34E within the body of the head portion 14. While the threaded plug 32F, 34F is shown to be threaded, any such engagement to allow a secure bottom may be used.

The springs 32E, 34E are operative to either be depressed "D", as is shown by the spring 34E in FIG. 6, or extended "E" as is shown by the spring 32E in FIG. 6. When the springs 32E, 34E are in the extended "E" position, the locking detent 32, 34 operatively engages a bottom 24A, 26A of the angle aperture 24 or half angle aperture 26, respectively. The bottom 26A is not shown but will be understood to function in the same way as the bottom 24A that is shown. Shown in FIG. 6 and FIG. 6A, the spring 32E is in its extended "E" position, and is engaged with the bottom 24A of the angle aperture 24 at the tapered surface 32B. Additionally, shown in FIG. 6, when the spring 34E is in its depressed "D" position, engaged with a bottom surface 16E of the first portion 16 is the tip 34A.

Having thus described an exemplary non-limiting configuration of adjustable T-square 10, its operation will be discussed with reference to some exemplary features used with the various embodiments.

Figure 7:
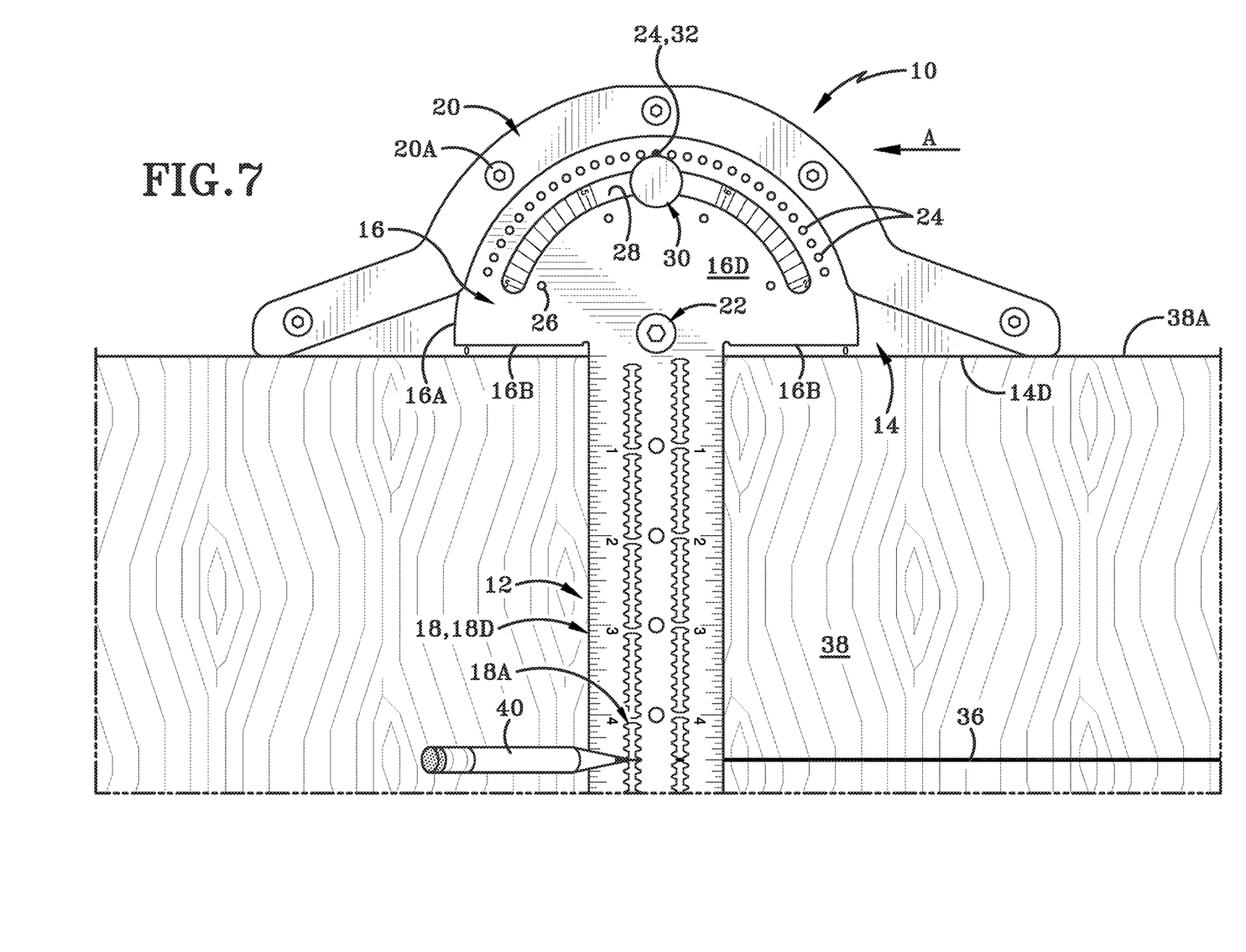
FIG. 7 is an operational top plan view of the exemplary adjustable T-square.

Referring specifically to FIG. 7, an operational top plan view of the exemplary adjustable T-square 10 is shown. In this view, a user has determined that they would like a straight line 36 on a work surface 38. As such, a user has abutted the head portion 14 at its flat portion 14D against an edge 38A of the work surface 38. The first locking detent 32 is engaged with the whole angle aperture 24 and the locking pin 30 is threaded into its threaded portion 30E so as to secure the ruler portion 12 to the head portion 14 along with the attachment member 22 being fully engaged with its aperture 22E. By locking both the attachment member 22 and locking pin 30 fully engaged, the angle (in this case zero degrees) is locked into place and will remain consistent during operation. The user then uses the measurement indicia 18B on the second portion 18 at the desired length. In the case of this figure, the desired distance is 4.5 inches.

The user then may place a writing implement 40 into the scribe notch 18A that corresponds to the location of the desired distance. The user may then move the entirety of the adjustable T-square 10 along the edge 38A of the work surface 38 in the direction indicated by arrow "A", thereby creating the straight line 36. The user is free to make a cut to the work surface 38 or continue with additional lines and dimensions as required for a work piece.

Figure 8:
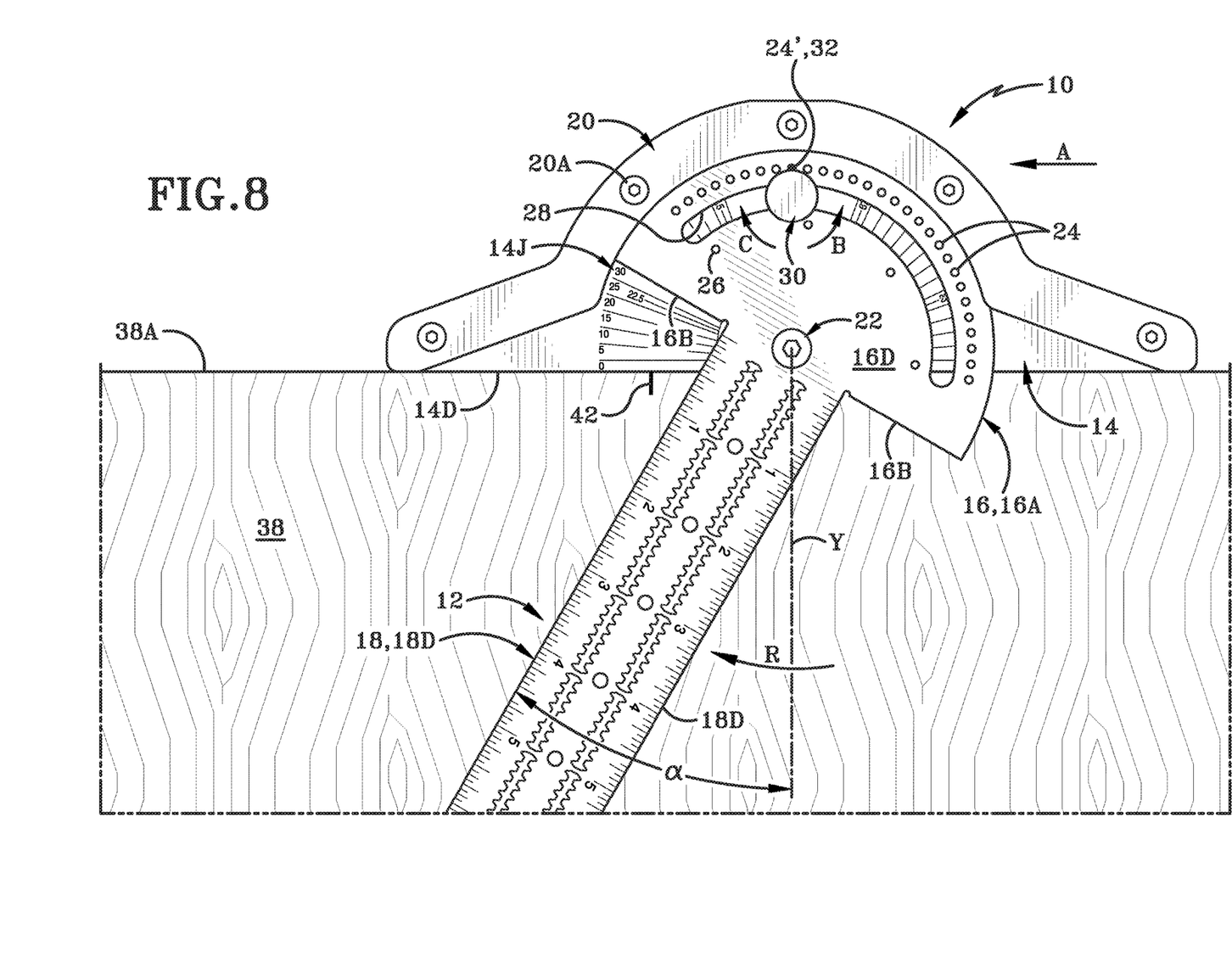
FIG. 8 is a further operational top plan view of the exemplary adjustable T-square being set to an angle.

Referring specifically to FIG. 8, a further operational top plan view shows the exemplary adjustable T-square 10 being set to an angle. A user has abutted the head portion 14 at its flat portion 14D against an edge 38A of a work surface 38. The user may make a distance guide mark 42 and then slide the adjustable T-square along the work surface 38 in the direction "A" to reach that guide mark 42 before continuing. As the attachment member 22 is operative to permit rotation of the first portion 16 of the ruler portion 12 while holding the first portion 16 engaged with the top surface 14F of the head portion 14. All the while the arced surface 16A is slightly underneath the face plate 20 to allow minimal play in this rotation within the channel 20C and distortion of the ruler portion 12 to allow for maximized accuracy of measurements.

The locking pin 30 is loosened by moving it in a first direction "B" (FIG. 8). By loosening the engagement of the locking pin 30 with its aperture 30E, the ruler portion 12 is free to move independent the head portion 14 and rotation may begin in direction "R" about the longitudinal axis "Y". Via this rotation "R", clicks consisting of audible and tactile feedback to a user may be heard and felt by a user. The series of clicks correspond to the detent locking pins 32, 34 at each marked indicia of angles 14J on the head portion 14. The bottom surface 16D of the first portion 16 makes contact with the tapered surface 32B of the first locking detent 32 at the bottom 24A of the whole angle aperture 24 and as the surface is tapered it allows the bottom surface 16D to ride along the edge of the taper until the bottom surface 16C is in contact with the tip 32A of the first locking detent 32, thereby placing the spring in its depressed condition "D" (FIG. 6). The locking detent 32 is operative to restrict movement in case of an accidental jostle as the tapered surface 32B coupled with the spring 32E acts so as to better align the tip 32A within the whole angle aperture 24 as the tapered surface 32B always tapers to the tip 32A. As such, the bottom 24A of the whole angle aperture is pushed by the tapered surface 32E to allow the spring to be in its extended position "E" (FIG. 6).

Continuing the rotation "R" (FIG. 8), the tip 32A continues to be in contact with the bottom surface 16D, until the next whole angle aperture 24 is rotated into location. When this occurs, and the tip 32A of the of the first locking detent 32 crosses the threshold of no longer being in contact with the bottom surface 16D and the tapered surface 32B coupled with the spring 32E combine to propel the spring from its depressed condition "D" into its extended condition "E" and reengage the first locking detent 32 with its tip 32A in the subsequent whole angle aperture 24. This rotation "R" may continue until reaching the desired angle as viewed by the identifying indicia 14J.

If a user desires to utilize a half angle aperture 26 for their measurement, a similar process would result. The first portion 16 via the bottom surface 16D continues to be in contact with the tip 34A of the second locking detent 34. The spring 32E remains in its depressed condition "D" (FIG. 6) during the contact. Continuing the rotation, the tip 34A continues to be in contact with the bottom surface 16D, until the next half angle aperture 26 is rotated into location. When this occurs, and the tip 34A of the second locking detent 34 crosses the threshold and is no longer in contact with the bottom surface 16D, the tapered surface 34B coupled with the spring 34E combine to propel the spring from its depressed condition "D" into its extended condition "E" (FIG. 6) and reengage the second locking detent 34 with its tip 34A in the subsequent half angle aperture 26. This rotation "R" may continue until reaching the desired angle as viewed by the identifying indicia 14J.

When the desired angle $\alpha$ is reached about the longitudinal axis "Y", the locking pin 30 is then tightened by moving it in a second direction "C" (FIG. 8). Tightening the engagement of the locking pin 30 with its aperture 30E, assures that rotation "R" will stop as the ruler portion 12 is no longer free to move independent of the head portion 14. In the exemplary drawing, the angle $\alpha$ is 30 degrees, but may be any angle that corresponds to a desired angle with an engaged angle aperture 24'. In the exemplary embodiment, that may be any angle from 0-70 degrees via multiples of five on both on the right and left sides corresponding to the whole angle apertures 24 as well as 22.5 and 67.5 degrees both on the right and left sides corresponding to the half angle apertures 26. Alternative embodiments may provide fewer or additional apertures providing a specialty engineered and customized adjustable T-square for specific projects and angles, as needed.

Figure 9:
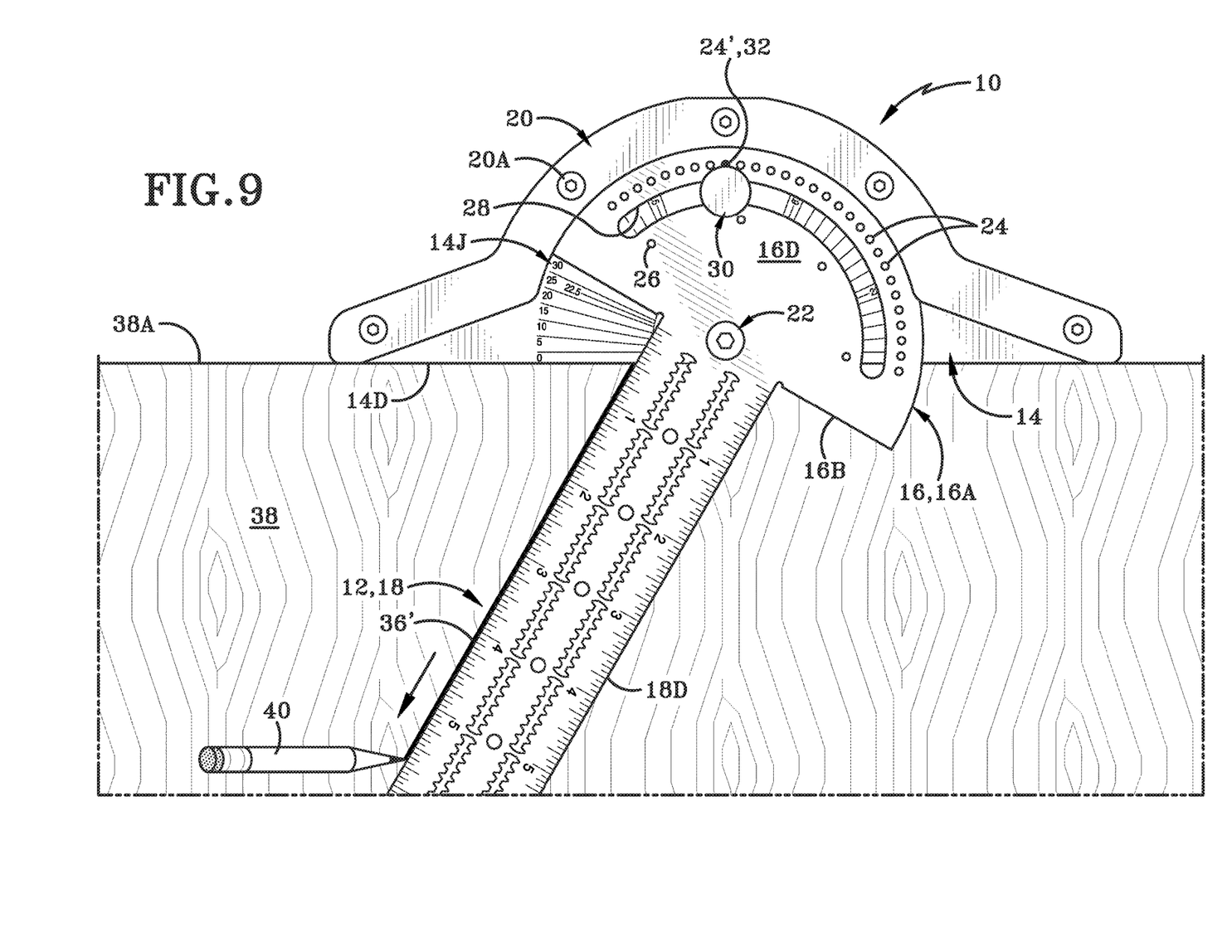
FIG. 9 is a further operational top plan view of the exemplary adjustable T-square being set to an angle and a user drawing a line with a precisely set angle.

A further operational top plan view is shown in FIG. 9 of the exemplary adjustable T-square 10 being set to an angle and a user drawing an angled line 36' along the edge 12C of the ruler portion 12 with a precisely set angle after moving the T-square into position along the work surface 38. Angle $\alpha$ is set where the first locking detent 32 is engaged with its respective angle aperture 24. The user may then use their writing implement 40 to draw an angled line 36' along the side of the ruler portion 12.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "element A and/or element B", when used in conjunction with open-ended language such as "comprising" can refer, in one embodiment, to element A only (optionally including elements other than element B); in another embodiment, to element B only (optionally including elements other than element A); in yet another embodiment, to both element A and element B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, any method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

In the foregoing description, certain terms have been used for brevity, clarity, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

What is claimed:

1. An adjustable T-square comprising:
   a head portion with a body adapted to sit adjacent to a work surface;
   a ruler portion movable relative to the head portion, wherein the ruler portion has a first portion and a second portion, and the first portion defines a plurality of angle apertures therein;
   a locking mechanism operative to lock the ruler portion in a fixed position relative to the head portion; and
   an alignment mechanism including at least one locking detent having a detent body operatively engaged with a spring; and
   wherein an aperture of the plurality of angle apertures is operative to accept the at least one locking detent when at least a portion of the detent body is received within the aperture and the spring is in an extended position.

2. The adjustable T-square of claim 1, further comprising:
   a pivot pin extending between the ruler portion and the head portion, said pivot pin enabling pivotal motion of the ruler portion relative to the head portion when the locking mechanism is disengaged.

3. The adjustable T-square of claim 2 wherein the locking mechanism further comprises:
   at least one locking pin.

4. The adjustable T-square of claim 3, wherein the at least one locking pin and pivot pin are operative to prevent movement of the ruler portion with respect to the head portion.

5. The adjustable T-square of claim 1, further comprising:
   a faceplate that extends partially over a first end of the ruler portion and is operatively connected to the head portion.

6. The adjustable T-square of claim 5, further comprising:
   a channel formed by the faceplate and a top surface of the head portion operative to permit movement of the ruler portion within the channel.

7. The adjustable T-square of claim 1, wherein the first portion of the ruler portion has an arced surface and wherein the plurality of angle apertures are defined in the arced surface and extend between an inner surface and an outer surface of the arced surface.

8. The adjustable T-square of claim 7, wherein the first portion further includes a track operative to accept a portion of a locking pin of the locking mechanism therein.

9. The adjustable T-square of claim 1, wherein the head portion further comprises:
   a plurality of indicia indicating angle of the ruler portion with respect to the head portion.

10. The adjustable T-square of claim 1, wherein the alignment mechanism includes:
    audible and tactile feedback members to operative to provide audible and tactile feedback to a user that the apparatus is set to a precise angle.

11. A method for drawing a straight angled line comprising:
    rotating a ruler portion of an adjustable T-square;
    aligning an alignment mechanism of the adjustable T-square with angled indicia on a head portion of the adjustable T-square;

engaging a locking mechanism of the adjustable T-square at a precise angle to prevent movement of the ruler portion with respect to the head portion;

using an edge of the ruler portion to draw a line with a writing implement at the precise angle; and wherein during rotating:

hearing audible feedback from the alignment mechanism which is operative to provide audible feedback to a user; and feeling tactile feedback from the alignment mechanism which is operative to provide tactile feedback to the user, wherein the audible feedback and the tactile feedback indicate to the user that the precise angle is engaged.

12. The method of claim 11, further comprising:

prior to rotating;

disengaging a locking mechanism that allows the ruler potion to rotate with respect to the head portion.

13. The method of claim 11, wherein aligning further comprises:

interlocking at least one locking detent into an aperture on the ruler portion.

14. The method of claim 11, where rotating comprises:

rotating the ruler portion about a pivot point engaged with the ruler portion and the head portion.

15. The method of claim 11, wherein prior to rotating:

abutting the head portion against a work surface.

16. An adjustable T-square comprising:

a head portion including a first surface and a second surface, wherein the first surface is adapted to rest adjacent an edge of a work piece, and the second surface is arranged at right angles to the first surface;

a recess defined in the second surface of the head portion, wherein the recess originates in the first surface and extends inwardly into the head portion and away from the first surface, and wherein the recess includes an arcuate section;

angle indicia provided on the second surface of the head portion in the arcuate section of the recess;

a ruler portion comprising a first portion and a second portion;

wherein the first portion is received within the arcuate section of the recess of the head portion;

wherein the second portion extends outwardly from the first portion and beyond the first surface of the head portion;

a pivot pin extending between the ruler portion and the head portion, said pivot pin enabling pivotal motion of the ruler portion relative to the head portion; and a locking mechanism extending between the ruler portion and the head portion a distance away from the pivot pin, said locking mechanism being movable between an engaged position and a disengaged position, and when the locking mechanism is in the engaged position, pivotal motion of the ruler portion relative to the head portion is prevented.

17. The adjustable T-square of claim 16, wherein the second portion of the ruler portion extends outwardly in a first direction from a straight edge of the first portion, wherein side edges of the second portion extend outwardly at right angles to the straight edge of the first portion; and wherein a section of the straight edge of the first portion of the ruler portion is selectively alignable with one of the angle indicia of the head portion.

18. The adjustable T-square of claim 17, wherein the first portion further includes an arcuate edge that curves convexly through 180° from a first end of the straight edge of the first portion to a second end of the straight edge of the first portion, and wherein the arcuate edge of the first portion of the ruler portion is complementary to the arcuate section of the recess of the head portion.

19. The adjustable T-square of claim 18, wherein the head portion includes a faceplate that overhangs the arcuate edge of the ruler portion.

20. The adjustable T-square of claim 16, further comprising an adjustment mechanism that provides both tactile and audible feedback when the ruler portion is pivoted relative to the head portion.

* * * * *